United States Patent
Yoshida

(10) Patent No.: US 8,625,114 B2
(45) Date of Patent: Jan. 7, 2014

(54) ELECTRONIC DEVICE AND MEDIUM FOR CHANGING DIALOG BOX TO BE DISPLAYED

(75) Inventor: Yasunari Yoshida, Aichi (JP)

(73) Assignee: Brother Kogyo Kabushiki Kaisha, Nagoya-shi Aichi-ken (JP)

(*) Notice: Subject to any disclaimer, the term of this patent is extended or adjusted under 35 U.S.C. 154(b) by 1864 days.

(21) Appl. No.: 11/645,593

(22) Filed: Dec. 27, 2006

(65) Prior Publication Data

US 2007/0146764 A1    Jun. 28, 2007

(30) Foreign Application Priority Data

Dec. 28, 2005 (JP) ................... 2005-377785

(51) Int. Cl.
*G06F 3/12* (2006.01)

(52) U.S. Cl.
USPC ............................ 358/1.13; 358/1.1; 358/1.15

(58) Field of Classification Search
USPC ................. 358/1.1, 1.12, 1.15, 1.13
See application file for complete search history.

(56) References Cited

U.S. PATENT DOCUMENTS

2002/0163667 A1* 11/2002 Noda ............................ 358/1.15
2008/0273216 A1* 11/2008 Moro et al. .................... 358/1.9

FOREIGN PATENT DOCUMENTS

| JP | 05-233189 A | 9/1993 | | |
|---|---|---|---|---|
| JP | 05-265681 A | 10/1993 | | |
| JP | 07-321967 A | 12/1995 | | |
| JP | 11-73281 | 3/1999 | | |
| JP | 11073281 | * 3/1999 | ............... | G06F 3/12 |
| JP | 11-180011 A | 7/1999 | | |
| JP | 2002-073232 A | 3/2002 | | |
| JP | 2002-323962 | 11/2002 | | |

OTHER PUBLICATIONS

JP11-073281English translation.*
Notice of Reasons for Rejection issued in Japanese counterpart Appln. No. 2005-377785 issued Mar. 3, 2011 (English translation).

* cited by examiner

*Primary Examiner* — King Poon
*Assistant Examiner* — Iriana Cruz
(74) *Attorney, Agent, or Firm* — Scully, Scott, Murphy & Presser PC

(57) ABSTRACT

An electronic device comprises a display system that displays a setting window for configuring setting items for each of functions of the electronic device, an input system through which information is inputted, a setting item information storing system that stores setting item information including location information for each of the setting items, a setting information storing system that stores setting information including information on an intended setting item and other setting items to be configured before configuring the intended setting item, a searching system that searches the intended setting item based on information inputted through the input system and the setting item information, a setting information generating system that generates the setting information, and a display control system that controls the display system to display the generated setting information and a setting window for each of the searched setting item and said other setting items.

16 Claims, 14 Drawing Sheets

| DIALOG BOX NAME | DIALOG LOCATION | CONDITION INFORMATION |
|---|---|---|
| BASIC | 0x100 | 0 |
| ADVANCED (COLOR) | 0x200 | 0 |
| ADVANCED (SCALING) | 0x300 | 0 |
| ADVANCED (WATERMARK) | 0x400 | 0 |
| ADVANCED (DEVICE OPTIONS) | 0x500 | 0 |
| SUPPORT | 0x600 | 0 |
| QUALITY | 0x110 | 0 |
| USER DEFINED SIZE | 0x120 | 2 |
| COLOR ENHANCEMENT | 0x111 | 1 |
| CUSTOM IMAGE TYPE | 0x210 | 0 |
| ⋮ | ⋮ | ⋮ |

FIG.15

| JUMP DESTINATION | LOCATION INFORMATION A | LOCATION INFORMATION B |
|---|---|---|
| WATERMARK | 0x400 | 1 |
| COLOR | 0x200 | 1 |
| COLOR DENSITY | 0x111 | 1 |
| QUICK PRINT SETUP | 0x500 | 2 |
| CONTRAST | 0x111 | 3 |
| STATUS MONITOR | 0x500 | 3 |
| MATCH MONITOR | 0x210 | 1 |
| USER DEFINED SIZE | 0x120 | 1 |
| PAGE LAYOUT | 0x100 | 5 |
| QUALITY | 0x100 | 2 |
| ORIENTATION | 0x100 | 7 |
| COLOR ENHANCEMENT | 0x110 | 2 |

FIG.16

| DIALOG BOX NAME | SETTING OPERATION |
|---|---|
| BASIC | SETTING ... |
| QUALITY | COLOR ENHANCEMENT |
| QUALITY | SETTING ... |
| COLOR ENHANCEMENT | COLOR DENSITY |

FIG. 17

ELECTRONIC DEVICE AND MEDIUM FOR CHANGING DIALOG BOX TO BE DISPLAYED

CROSS-REFERENCE TO RELATED APPLICATION

This application claims priority under 35 U.S.C. §119 from Japanese Patent Application No. 2005-377785, filed on Dec. 28, 2005. The entire subject matter of the application is incorporated herein by reference.

BACKGROUND

1. Technical Field

The following description relates to one or more electronic devices and computer usable media for changing a dialog box to be displayed.

2. Related Art

For example, when a personal computer (hereinafter, simply referred to as a PC) controls a printer connected therewith to print a document, an operation of printing the document is performed after configuring settings for pages to be printed, the number of copies, and double face printing on a print setting window (so-called dialog box) displayed by driver software installed in the PC being run.

Recently, a printer driver has further been improved to provide multiple functions and high performances. Conventionally, there has been provided a help function as a support function that allows a user to smoothly perform a printing operation effectively using such a printer driver. When the user wishes to know a procedure of configuring the print settings, for example, by pressing a help key on the screen, the user can refer to a descriptive text regarding the procedure displayed on a screen that the help function provides.

However, the conventional help function can help the user to effectively use the printer driver, while it is impossible to promptly reach intended setting items associated with a function the user wishes to use or know with a user supporting message provided by the conventional help function. Therefore, a beginner cannot effectively utilize the multifunctional driver with the conventional help function. In addition, when a rank beginner utilizes the conventional help function, it takes a lot of time until the printing operation is performed after reading the descriptive text displayed.

To solve such a problem, there have been invented a printer system and a printing method that allow even the rank beginner to effectively utilize the multifunctional printer driver and to promptly reach the desired print setting items (see Japanese Patent Provisional Publication No. HEI 11-73281).

Further, in order to improve a retrievable property and operability of a printer in the case of utilizing a box provided in the printer as a storage device, there have been invented a printing system configured to designate a printing job to be processed among printing jobs inputted into a plurality of boxes of the printer by an information processing device, and the information processing device, printer, printing method, and program used for the printing system (see Japanese Patent Provisional Publication No. 2002-323962).

In an example of Japanese Patent Provisional Publication No. HEI 11-73281, although operations of retrieving and displaying a dialog box are performed, in the case of configuring a setting with the dialog box, information on another setting to be updated associated with the setting is not displayed. Therefore, it might cause a problem that a setting unnecessary for the user is configured.

In an example of Japanese Patent Provisional Publication No. 2002-323962, although it is possible to call for a print dialog box on a box dialog box and configure settings for the printing operation, there are not described details about the settings for the printing operation such as retrieving and displaying the dialog box.

SUMMARY

Aspects of the present invention are advantageous in that there can be provided one or more improved electronic device and computer usable media with which it is possible to search and display a process of setting items to be configured until a dialog box for configuring an intended setting item to be updated is displayed in addition to searching the dialog box.

BRIEF DESCRIPTION OF THE ACCOMPANYING DRAWINGS

FIG. 15 shows an example of dialog information in accordance with one or more aspects of the present invention.

FIG. 16 shows an example of jump destination information in accordance with one or more aspects of the present invention.

FIG. 17 shows an example of dialog change information list in accordance with one or more aspects of the present invention.

DETAILED DESCRIPTION

Figure 1:
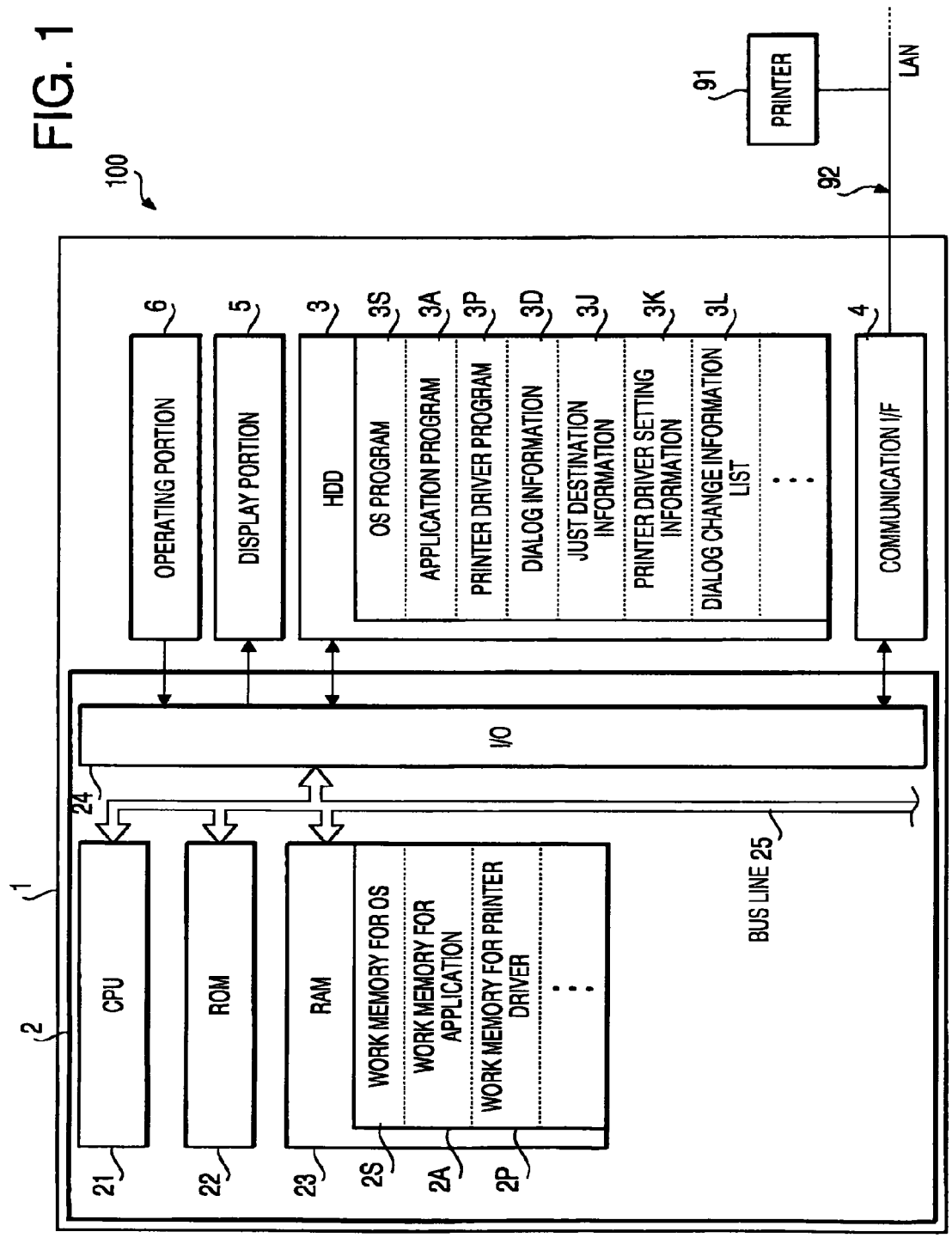
FIG. 1 is a block diagram of a printing system as an example of an electronic device in accordance with one or more aspects of the present invention.

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided an electronic device provided with a plurality of functions, which comprises: a display system configured to display a setting window for configuring setting items for each of the plurality of functions of the electronic device; an input system through which information for configuring the setting items for each of the plurality of functions is inputted on the setting window displayed on the display system; a setting item information storing system configured to store setting item information that includes location information associated with each of the setting items; a setting information storing system configured to store setting information that includes information on an intended setting item to be configured and information on other setting items to be configured prior to configuring the intended setting item associated with each other; a searching system configured to search the intended setting item based on a keyword inputted through the input system and the setting item information stored in the setting item information storing system; a setting information generating system configured to generate setting information that includes information on the intended setting item searched by the searching system and information on said other setting items to be configured prior to configuring the searched setting item associated with each other based on the setting item information stored in the setting item information storing system; and a display control system configured to control the display system to display the setting information generated by the setting information generating system and a setting window for each of the searched setting item and said other setting items to be configured prior to configuring the searched setting item, based on the setting item information and setting information.

According to some aspects, it is possible not only to search an intended setting item, but also to check setting items to be configured prior to configuring the intended setting item. Therefore, a user can easily reach the intended setting item that the user wishes to configure.

Optionally, the setting items for the plurality of functions of the electronic device may be categorized based on a hierarchy structure. In this case, the setting item information storing system may be configured to store the setting item information that includes hierarchy structural location information based on the hierarchy structure of the setting items associated with each of the setting items.

According to some aspects, by referring to the hierarchy structural location information, there is required less searching time than a searching method of sequentially tracing setting operations based on a conventional help function. In addition, it is possible to check how the user can reach the intended setting item from a current setting item.

Optionally, the setting information storing system may be configured to store the setting information, generated by the setting information generating system based on the setting item information, which includes information on setting operations for said other setting items to be configured prior to configuring the intended setting item in an order in which the setting operations are to be configured from a setting for a current setting item based on the hierarchy structure of the setting items.

According to some aspects, by referring to the setting information configured as above, since it is possible to check a process of the settings to be configured prior to configuring the intended setting item, the searching time is further reduced. In addition, it is possible to more easily know how the user can reach the intended setting item from a current setting item.

Optionally, the display control system may be configured to control the display system to sequentially display a setting window, on which a setting operation is then performed, for each of said other setting items to be configured prior to configuring the intended setting item in an order from a setting window for a current setting item based on the hierarchy structure of the setting items and then display the setting window for the intended setting item, based on the setting item information and setting information.

According to some aspects, there is sequentially displayed on the display system a setting window for each of said other setting items to be configured prior to configuring the intended setting item, and a setting operation is concurrently performed on the setting window. Thus, the user can reach the intended setting item without performing the setting operations for said other setting items to be configured prior to configuring the intended setting item.

Optionally, the display control system may be configured to control the display system to inform that the setting window for the intended setting item has been displayed.

According to some aspects, the user can easily know that the user has reached the intended setting item by the display control system configured as above.

Optionally, the setting item information storing system may be configured to store the setting item information that includes condition information, which represents a setting condition for a setting item one hierarchy level higher than each of the setting items, the setting condition being necessary for configuring each of the setting items after configuring the setting item one hierarchy level higher than each of the setting items.

According to some aspects, by referring to the setting item information configured as above, it is possible to check a setting condition necessary for reaching a setting item from a setting item one hierarchy level higher than the setting item to be reached. Therefore, the user can easily reach the intended setting item.

Optionally, when the searching system has searched a plurality of setting items as the intended setting item, the searching system may be configured to select the intended setting item in accordance with input information inputted through the input system from the plurality of setting items searched by the searching system.

According to some aspects, even when the searching system has searched a plurality of setting items as the intended setting item, it is possible to select the intended setting item from the plurality of setting items searched. Thereby, it is possible to search the intended setting item even based on a vague input information (keyword) inputted through the input system.

According to another aspect of the present invention, there is provided a computer usable medium having computer readable instructions that cause a computer to serve as: a display system configured to display a setting window for configuring setting items for each of the plurality of functions of the electronic device; an input system through which necessary information is inputted to configure the setting items for each of the plurality of functions on the setting window displayed on the display system; a setting item information storing system configured to store setting item information that includes location information associated with each of the setting items; a setting information storing system configured to store setting information that includes information on an intended setting item to be configured and information on other setting items to be configured prior to configuring the intended setting item associated with each other; a searching system configured to search the intended setting item based on a keyword inputted through the input system and the setting item information stored in the setting item information storing system; a setting information generating system configured to generate setting information that includes information on the intended setting item searched by the searching system and information on said other setting items to be configured prior to configuring the searched setting item associated with each other based on the setting item information stored in the setting item information storing system; and a display control system configured to control the display system to display the setting information generated by the setting information generating system and a setting window for each of the searched setting item and said other setting items to be configured prior to configuring the searched setting item.

According to some aspects, by using a computer usable medium configured as above, the same effects as those brought by the aforementioned electronic device can be expected.

Illustrative Aspects

Figure 2:
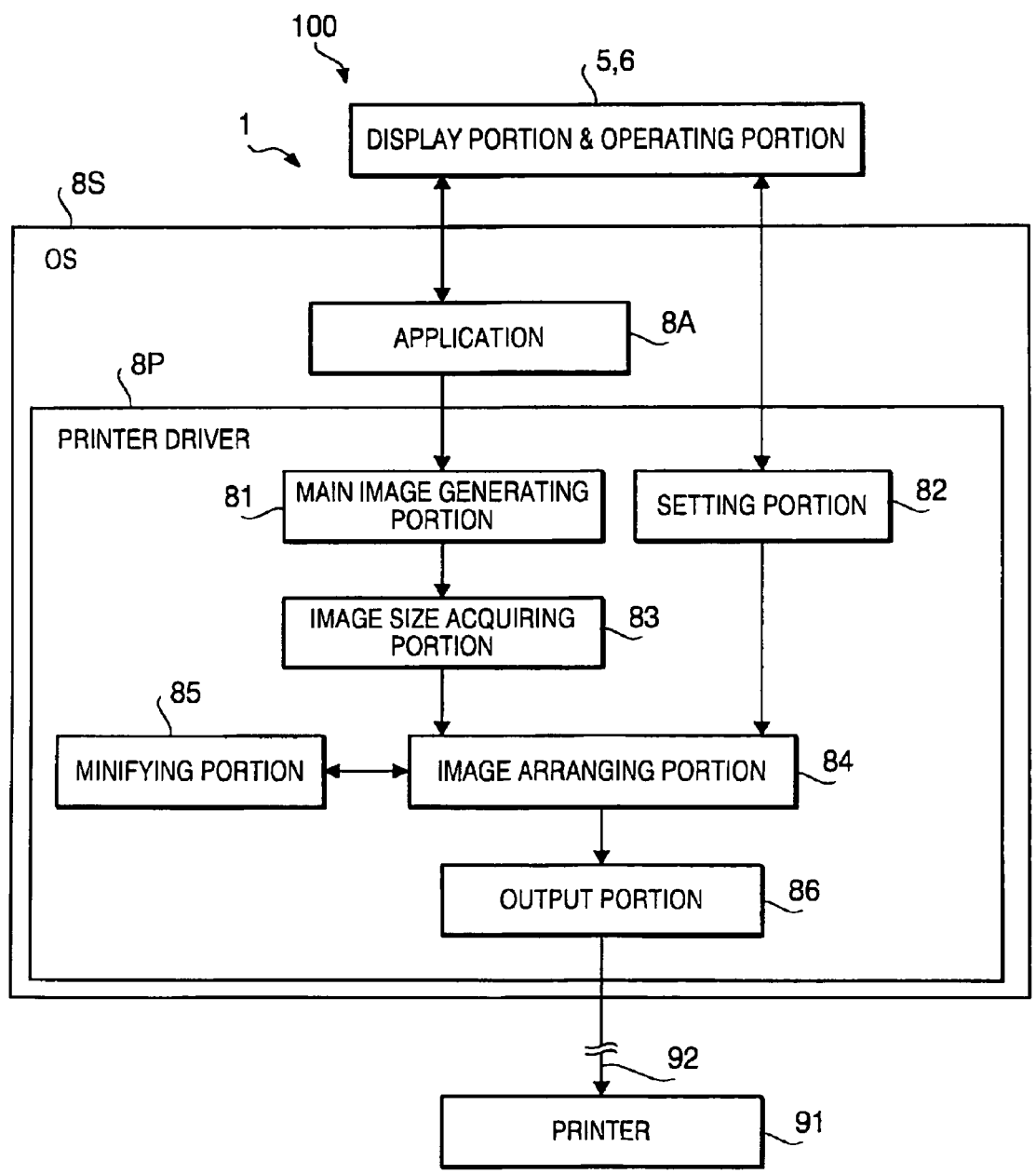
FIG. 2 is a functional block diagram of a personal computer in accordance with one or more aspects of the present invention.

Hereinafter, embodiments of an electronic device according to the present invention will be described with reference to the accompanying drawings, citing a printing system 100 as an example. FIG. 1 shows a configuration of the printing system 100 and an electrical block diagram of a personal computer 1 (hereinafter, simply referred to as a PC 1). Further, FIG. 2 shows a functional block diagram of the PC 1. The PC 1 operates with a printer 91 connected therewith. When the PC 1 transmits a print instruction, the printer that has received the print instruction executes a printing process. The PC 1 includes a printer driver program 3P (see FIG. 1), which serves as a printer driver 8P (see FIG. 2). The printer driver 8P has an image data arranging function, and controls the printer 91 to print a plurality of manuscripts (image data) being arranged with no space between any couple of adjacent image data. Hereinafter, each of configurations will be explained in detail.

As shown in FIG. 1, the PC 1 is configured as a widely known personal computer and provided with a hard disk drive (HDD) 3, communication interface (I/F) 4, display portion 5, operating portion 6, and control circuit 2 connected with those elements.

There are stored in the HDD 3 an OS program 3S that functions as an operation system (OS) 8S for operating the PC 1, an application program 3A that functions as an application 8A which operates on the OS 8S, a printer driver program 3P that functions as the printer driver 8P which operates on the OS 8S in the same manner, a dialog information 3D (see FIG. 15: to be described in detail later), a jump destination information 3J (see FIG. 16: to be described in detail later), a printer driver setting information 3K as a current setting status of the printer driver 8P, and a dialog change information list 3L (see FIG. 17: to be described in detail later).

The communication I/F 4 is configured with a network adapter having an interface function between a Local Area Network (LAN) 92 and itself. Thereby, communication with devices connected with the LAN 92 such as the printer 91 is attained.

The display portion 5 is configured with a display device such as a liquid crystal display (LCD) device and CRT device. The operating portion 6 is configured with a pointing device such as a mouse or an operating means such as a keyboard.

The control circuit 2 is configured as a normal computer, and provided with a CPU 21, ROM 22, RAM 23, input/output interface (I/O) 24, and bus line 25 for connecting those elements. The CPU 21 performs a control operation based on the OS program 3S stored in the HDD 3. The OS program 3S is run using a work memory for an OS 2S on the RAM 23 as a working area. In addition, the application program 3A and printer driver program 3P are run using a work memory for an application 2A and work memory 2P for a printer driver on the RAM 23 as working areas, respectively.

The printer 91 is connected with the LAN 92 to be capable of data communication with the PC 1, and perform a printing process in response to receiving an instruction from the PC 1. In order for the printer 91 to operate in this manner, the printer driver 8P corresponding to the printer 91 is required to be installed into the PC 1. It is noted that although the printer 91 is indirectly connected with the PC 1 through the LAN 92 in the embodiment, it may directly be connected with the PC 1 through a parallel port or a USB port (both not shown).

An operation of the PC 1 will be described. The PC 1 attains the function of the printer driver 8P shown in FIG. 2 with CPU 21 running the printer driver program 3P stored in the HDD 3.

The printer driver 8P is a module that generates printing data depending on the printer 91 as an output device and transmits the printing data, and includes a main image generating portion 81, setting portion 82, image size acquiring portion 83, image arranging portion 84, minifying portion 85, and output portion 86.

Figure 4:
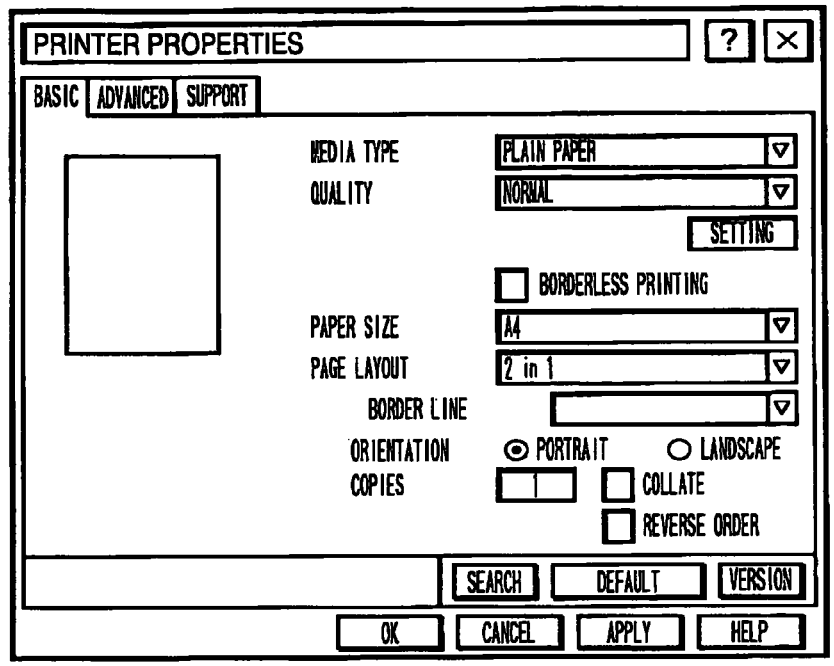
FIG. 4 shows an example of a dialog box "Basic" in accordance with one or more aspects of the present invention.

When a user creates an arbitrary manuscript with the application 8A of a level than the printer driver 8P and provides a printing instruction for printing the manuscript, manuscript data are supplied to the printer driver 8P to print the manuscript with the printer 91. In response to the manuscript data being supplied, the main image generating portion 81 generates image data of image to be printed (data of a main image), for example, as bit map data based on the supplied manuscript data. Then, a dialog box "Print Settings for Printer" as shown in FIG. 4 is displayed on a screen of the display portion 5.

Operating the operating portion 6 while watching a dialog box "Basic", the user configures settings for a media type (paper type), quality (image quality), paper size, page layout (the number of printed pages per paper), a border line for indicating a border of each of pages in the case of printing a plurality of pages on each paper, a print orientation (portrait/landscape), the number of copies, and the like. Further, when changing settings for other functions, the user opens a dialog box "Advanced" or "Support", and configures setting items included in each of the dialog boxes (not shown).

After the setting by the user has been completed and a button "Apply" has been clicked, in the printer driver 8P, the image arranging portion 84 creates layout data based on instructions that has been provided to the setting portion 82 based on the setting data inputted.

At this time, when a manuscript size read out by the image size acquiring potion 83 is different from a paper size, or when two or more manuscripts are printed on a single page, the manuscript size is minified to conform to the paper size by the minifying portion 85.

In addition, when a button "OK" is clicked, after the same operations as the case of the button "Apply" being clicked have been performed, the layout data created by the image arranging portion 84 are sent to the output portion 86. Then, the layout data are sent to the printer 91 via the communication I/F 4 and the LAN 92, and the printing operation is performed by the printer 91 based on the layout data.

Figure 3:
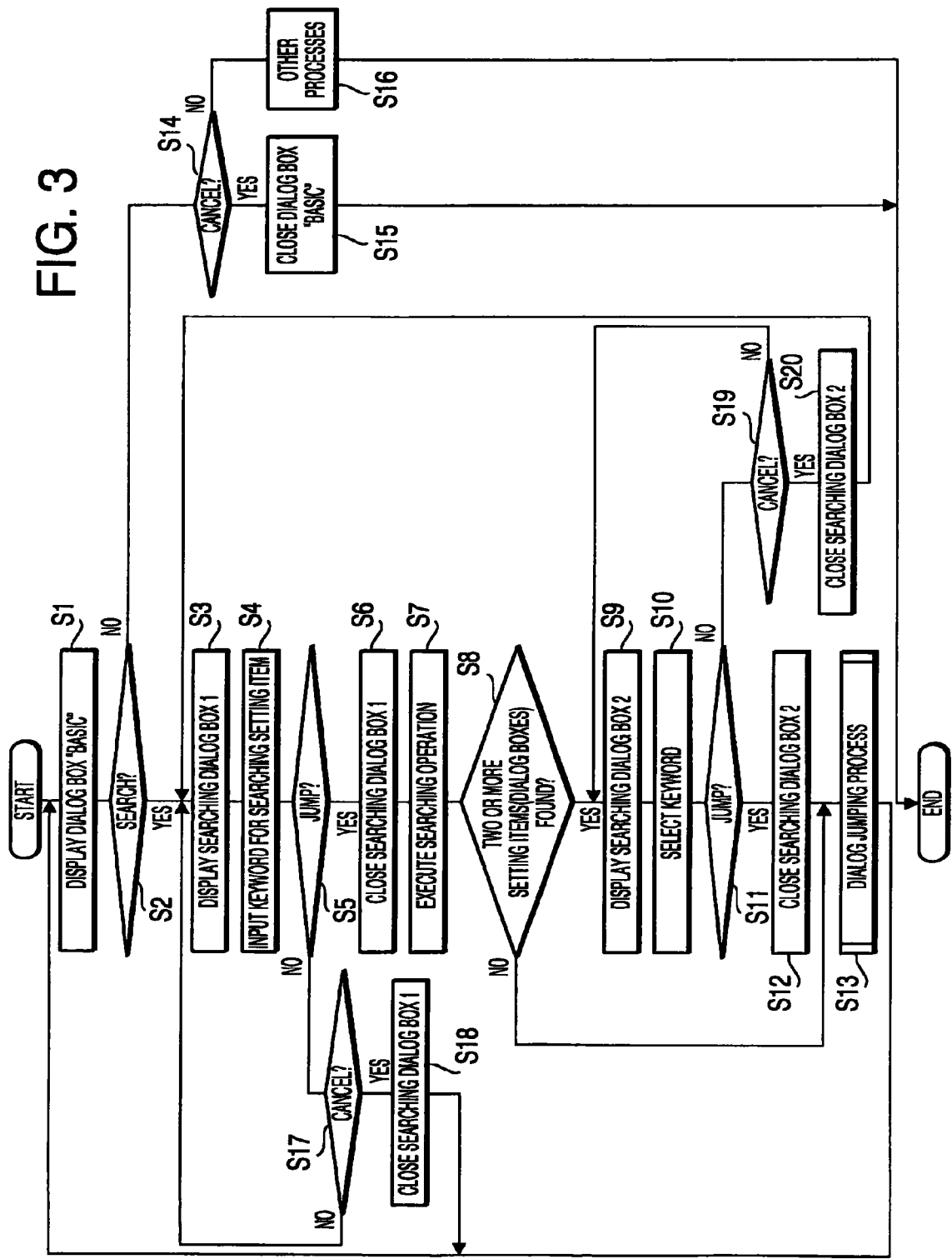
FIG. 3 is a flowchart showing a procedure of a dialog searching process in accordance with one or more aspects of the present invention.
Figure 5:
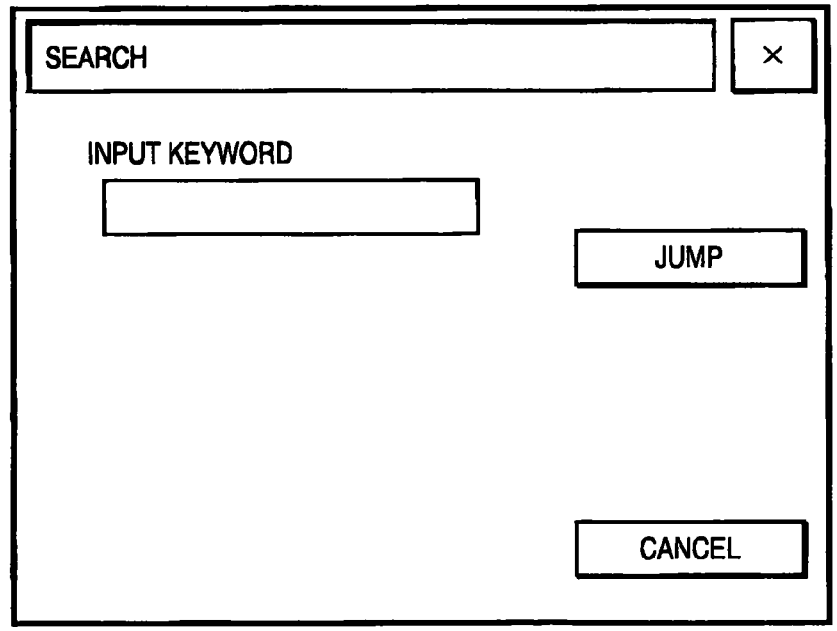
FIG. 5 shows an example of a searching dialog box 1 (keyword input) in accordance with one or more aspects of the present invention.

Referring to FIG. 3, a dialog searching process will be explained. Firstly, when the user creates a manuscript and issues the print instruction with the application 8A at a higher level than the printer driver 8P, the dialog box "Basic" in the dialog box "Print Settings for Printer", as shown in FIG. 4, is displayed on the screen of the display portion 5 (S1). Here, when a button "Search" is clicked (S2: Yes), a searching dialog box 1 as shown in FIG. 5 is displayed (S3), for example, in a manner overlapped in front of the dialog box "Basic".

Next, when a name of a setting item to be configured or a portion thereof (keyword) is inputted in a keyword entry field of the searching dialog box 1 (S4) and a button "Jump" is clicked (S5: Yes), the searching dialog box 1 is closed (S6). A dialog box for a setting item whose name corresponds to or includes the inputted keyword is searched with reference to the dialog information 3D (see FIG. 15: to be described in detail later) stored in the HDD 3 (S7).

Figure 6:
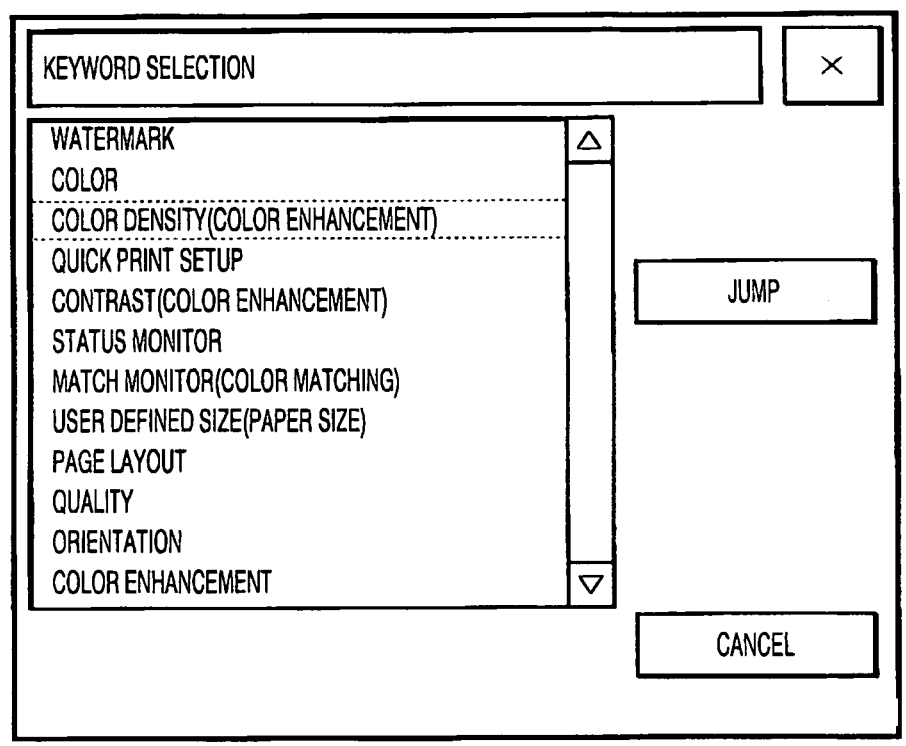
FIG. 6 shows an example of a searching dialog box 2 (a result of a keyword searching) in accordance with one or more aspects of the present invention.

Subsequently, as a result of the searching, when two or more setting items (dialog boxes) corresponding to the inputted keyword have been found (S8: Yes), a searching dialog box 2 for selecting a keyword as shown in FIG. 6 is displayed (S9), and an intended keyword is selected (S10). An example of FIG. 6 shows the result of the searching in the case where a keyword "color" is inputted. There are stored in the dialog information keywords "Color" and "Color Density (Color Enhancement)". Therefore, there are displayed setting item names including the keyword "color" and setting item names listed in front and in the rear thereof. In addition, such a configuration that only the setting item names including the keyword "color" are displayed may be possible.

When, on the searching dialog box 2 shown in FIG. 6, for instance, "Color Density (Color Enhancement)" is selected (S11: Yes), the searching dialog box 2 is closed (S12). Then, a dialog jumping process (see FIG. 7: to be described in detail later) for going to the intended setting item (dialog box) "Color Density (Color Enhancement)" is executed (S13).

On the other hand, when only one keyword is found as a result of the searching, for example, in the case where the keyword "Color Density" is inputted into the entry field of the searching dialog box 1 (S8: No), the dialog jumping process is executed without the searching dialog box 2 being displayed (S13).

In addition, when the dialog box "Basic" shown in FIG. 4 is displayed and a "Cancel" button (or a button indicated by a sign "x" in the center of "☐", the same applies to following drawings) is clicked (S2: No→S14: Yes), the dialog box "Basic", that is, the dialog box "Print Settings for Printer" is closed (S15), and another process of the application 8A is executed. Further, when one of operations other than clicking the "Cancel" button (S14: No), a process according to the operation is performed (S16).

In addition, when the searching dialog box 1 shown in FIG. 5 is displayed and a "Cancel" button is clicked (S5: No→S17: Yes), the searching dialog box 1 is closed (S18), and the process goes back to the step of S1, where the dialog box "Basic" shown in FIG. 4 is displayed.

Further, when the searching dialog box 2 shown in FIG. 6 is displayed and a "Cancel" button is clicked (S11: No→S19: Yes), the searching dialog box 2 is closed (S20), and the process goes back to the step of S3, where the searching dialog box 1 shown in FIG. 5 is displayed.

Referring to FIGS. 7 to 10, the dialog jumping process corresponding to the step of S13 in FIG. 3 will be described. Firstly, for example, when the keyword "Color Density (Color Enhancement)" is selected and the "Jump" button is clicked on the searching dialog box 2 shown in FIG. 6, there is executed a dialog change information generating process (S31: to be described in detail later) where the dialog change information list 3L (see FIG. 17: to be described in detail later) is generated with reference to the dialog information 3D (see FIG. 15: to be described in detail later) and the jump destination information 3J (see FIG. 16: to be described in detail later).

Figure 8:
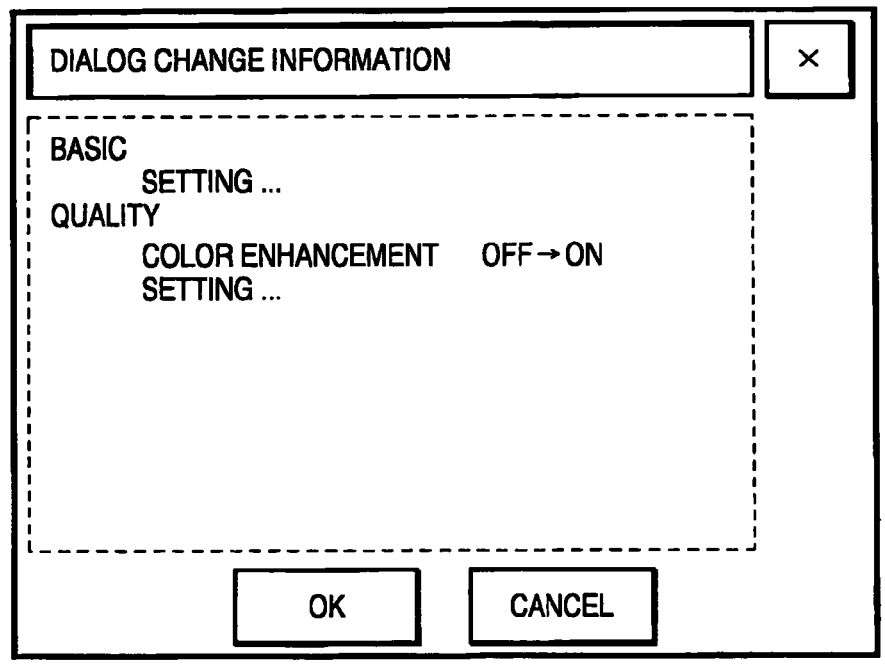
FIG. 8 shows an example of a dialog change information window in accordance with one or more aspects of the present invention.

Subsequently, a dialog change information window is displayed on the screen of the display portion 5 (S32) based on the dialog change information list 3L (see FIG. 17: to be described in detail later). FIG. 8 is an example of the dialog change information window, where there is displayed dialog change information in the case where a dialog box to be displayed is changed from the dialog box "Basic" being currently displayed to a dialog box "Color Enhancement". The dialog change information window shown in FIG. 8 indicates a procedure of operations as follows: firstly, a "Set" button is clicked on the "Basic" dialog box to open a dialog box "Quality"; subsequently, a check box "Color Enhancement" is checked to change a state of the setting item from an OFF (invalid) state to an ON (valid) state; finally, a "Setting" button is clicked so as to open the dialog box "Color Enhancement".

Figure 9:
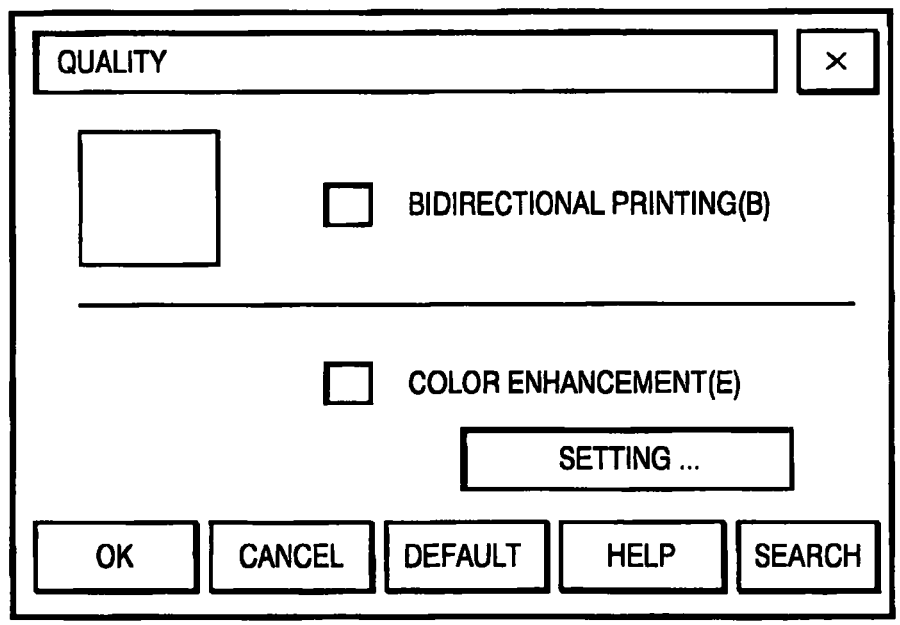
FIG. 9 shows an example of a dialog box "Quality" in accordance with one or more aspects of the present invention.
Figure 10:
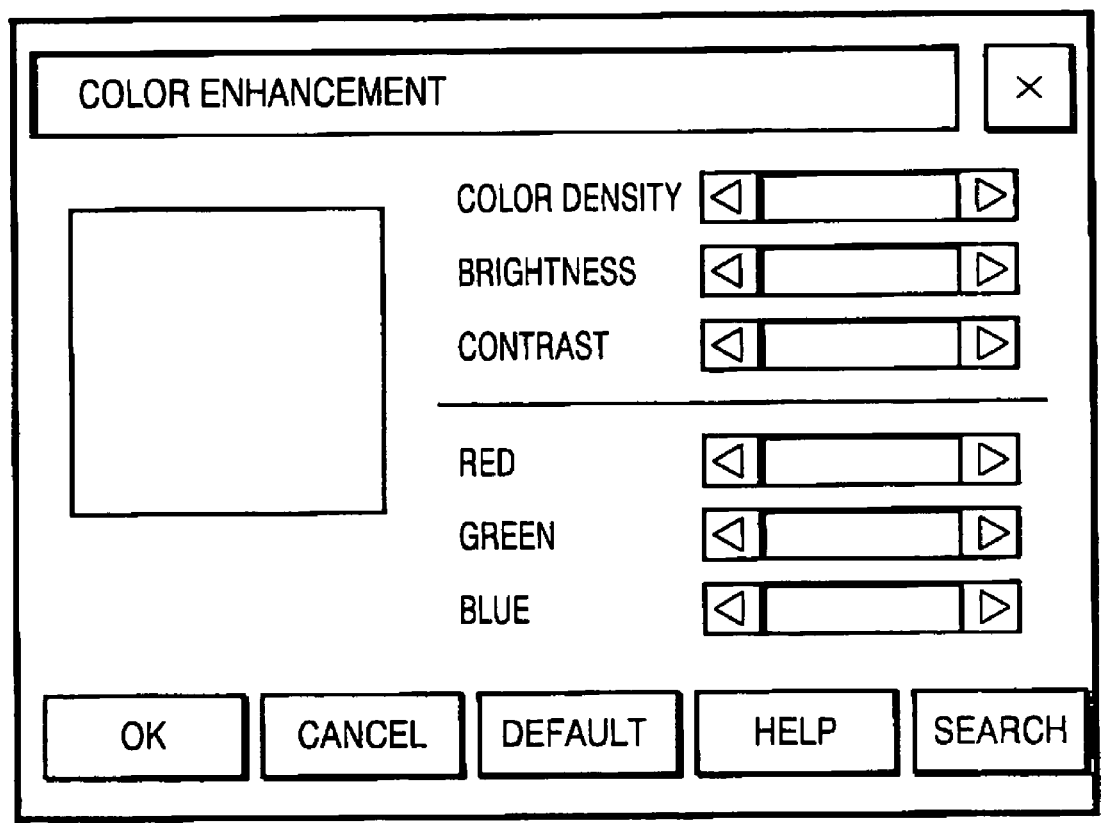
FIG. 10 shows an example of a dialog box "Color Enhancement" in accordance with one or more aspects of the present invention.

When the user judges that there is no problem in the dialog change process shown in FIG. 8 and an "OK" button is clicked on the dialog change information window shown in FIG. 8 (S33: Yes), the dialog change information window is closed (S34), and the intended dialog box is opened (S35). In order to change the dialog box to be displayed, in a state where the dialog box "Basic" is displayed on the screen of the display portion 5, firstly, the dialog box "Print Quality" as shown in FIG. 9 is displayed in a manner overlapped on the dialog box "Basic". Next, there is displayed a state where the check box "Color Enhancement" is checked. Then, the same display image as the "Setting" button being clicked is displayed, and the dialog box "Color Enhancement" as shown in FIG. 10 is displayed. Here, the user can adjust the color density.

When the dialog box "Color Enhancement" shown in FIG. 10 is displayed, in order to indicate that the intended dialog box has finally been opened, a title bar (a frame portion in which characters "Color Enhancement" is displayed) may be configured to blink a predetermined number of times such as three times, or to be displayed in a color different from a normal display color for a predetermined time period such as three seconds after the intended dialog box has been opened.

In the meantime, when a "Cancel" button is clicked in FIG. 10, settings up to a setting immediately prior to adjusting the color density, i.e., settings up to "Color Enhancement" set in the ON (valid) state are effective. At this time, contents read into the work memory 2P for the printer driver is totally cleared. In addition, there may be possible such a configuration that the dialog boxes are sequentially displayed to track back the dialog change process indicated in the dialog change information list 3L (see FIG. 17: to be described in detail later) from the currently displayed dialog box (the dialog box "Color Enhancement") to the dialog box on which the "Search" button has been clicked (the dialog box "Basic") when the "Cancel" button is clicked, and that at that time, the settings configured are restored to their original state.

Further, when the user does not wish to configure the settings for "Color Enhancement", after clicking the "Cancel" button at the time the dialog change information window shown in FIG. 8 is displayed (S33: No S36: Yes), the dialog change information window is closed (S37), and the process goes back to the state where the dialog box "Basic" is displayed (S1). At this time, contents read into the work memory ZP for the printer driver are totally cleared.

Figure 7:
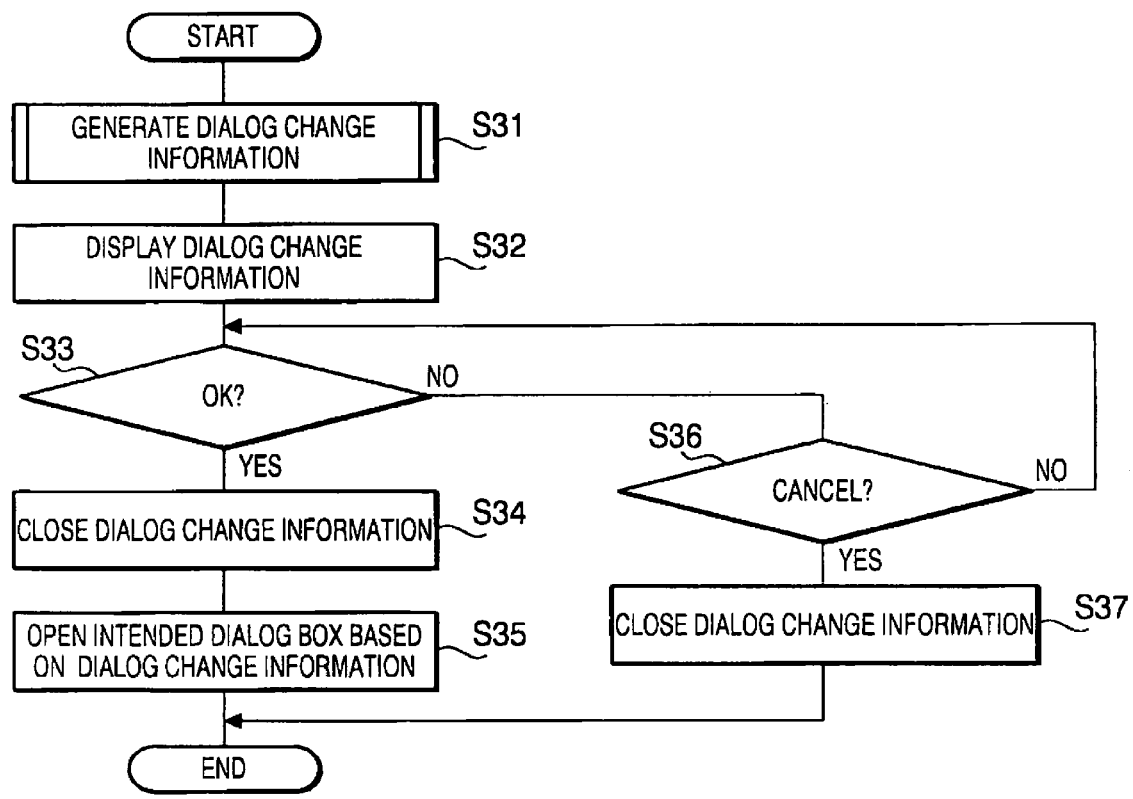
FIG. 7 is a flowchart showing a procedure of a dialog jumping process in accordance with one or more aspects of the present invention.

Referring to FIGS. 11 to 17, the dialog change information generating process corresponding to the step of S31 in FIG. 7 will be described. Firstly, the printer driver setting information 3K stored in the HDD 3 is read into the work memory 2P for the printer driver (S41). Next, with reference to the dialog information 3D (see FIG. 15: to be described in detail later) and the jump destination information 3J (see FIG. 16: to be described in detail later), dialog information regarding the current dialog box and the dialog box as a jump destination inputted on the searching dialog box 2 is obtained (S42). Further, a current dialog location (to be described in detail later) is read into a dialog location information buffer whose memory area is secured in the work memory 2P for the printer driver.

Subsequently, there is executed a process of comparing main dialog locations for the current dialog box and the dialog box as the jump destination (S43: to be described in detail later). In the same manner, there are executed a process of comparing sub dialog locations for the current dialog box and the dialog box as the jump destination (S44: to be described in detail later), and then a process of comparing sub-sub dialog locations for the both dialog boxes (S45: to be described in detail later). Then, based on the dialog change information updated through the steps of S43 to S45, information on the dialog change process is obtained, so as to generate the dialog change information list 3L (see FIG. 17: to be described in detail later) (S46).

Figure 11:
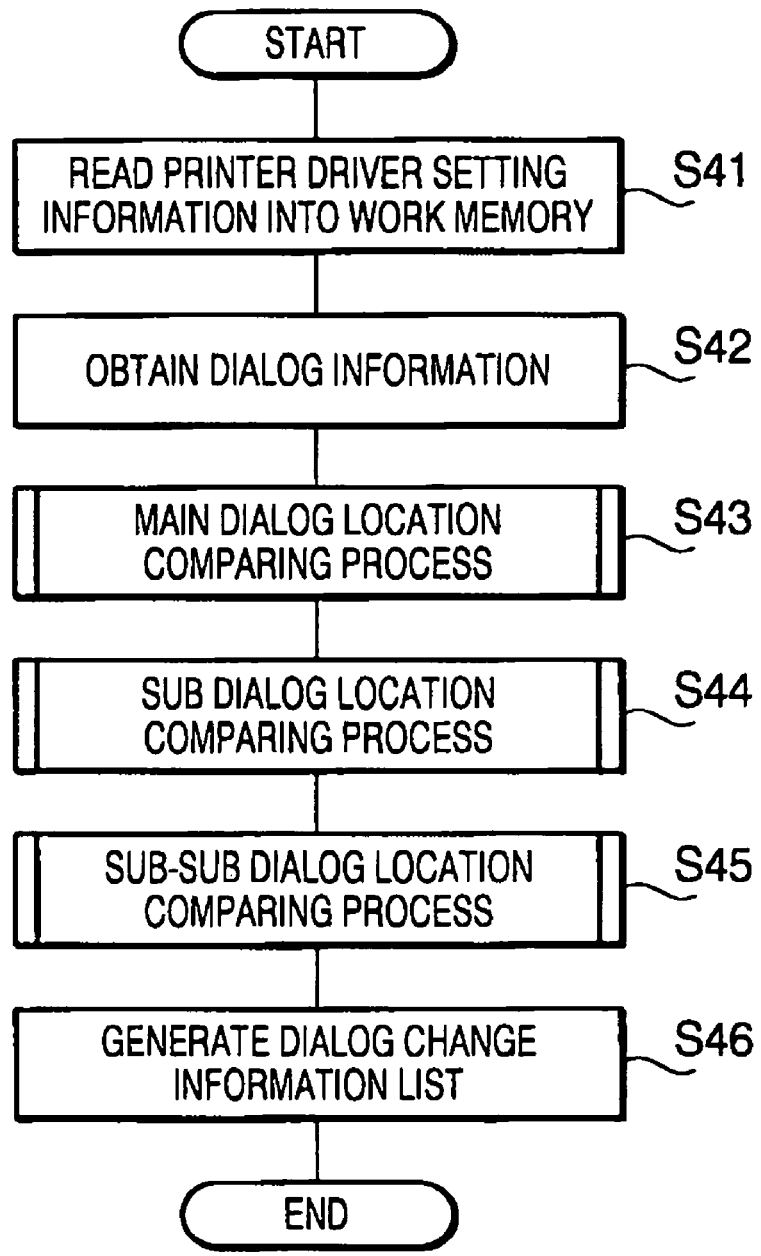
FIG. 11 is a flowchart showing a procedure of a dialog change information generating process in accordance with one or more aspects of the present invention.
Figure 12:
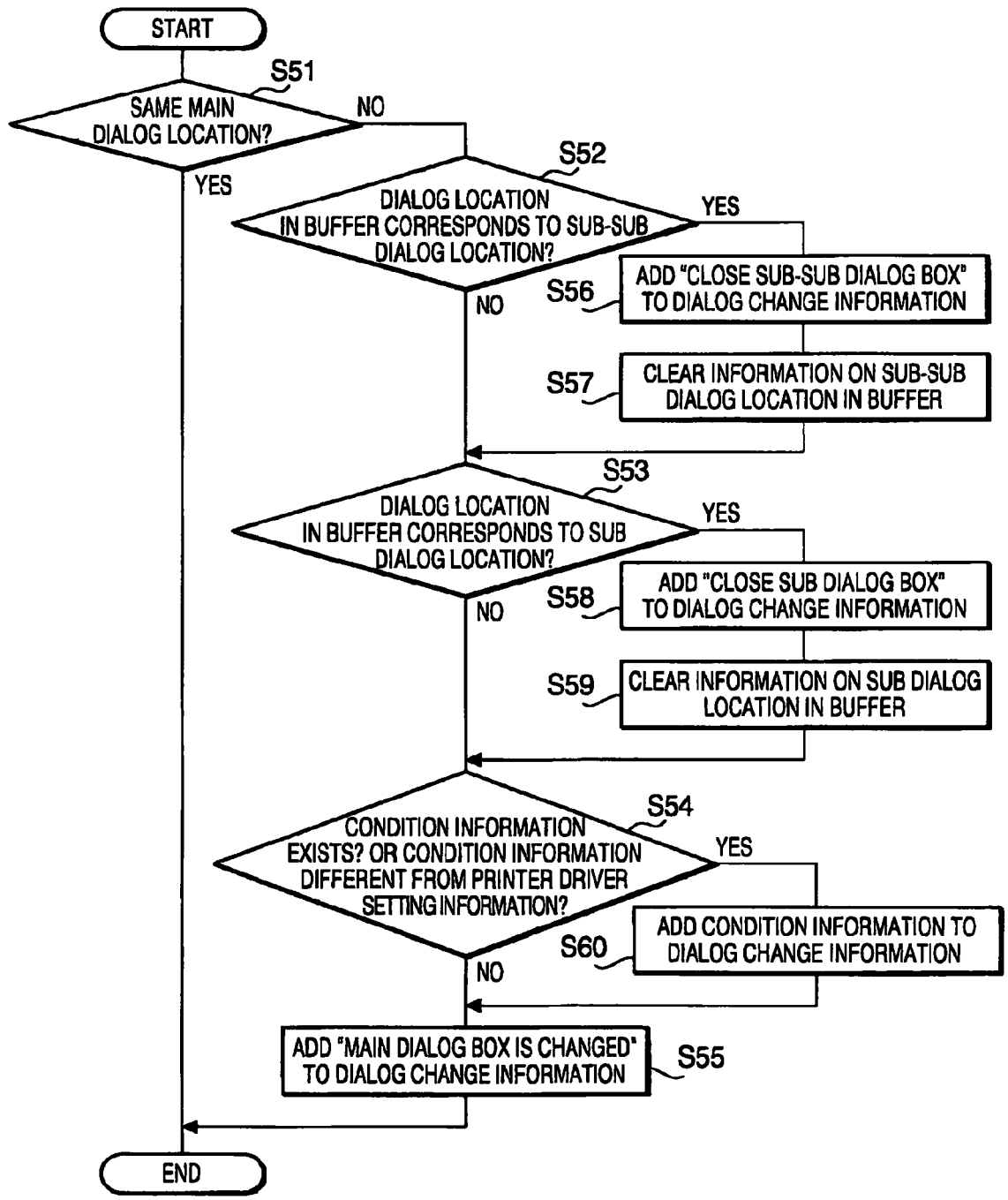
FIG. 12 is a flowchart showing a procedure of a main dialog location comparing process in accordance with one or more aspects of the present invention.

Referring to FIG. 12, the main dialog location comparing process corresponding to the step of S43 in FIG. 11 will be described. Firstly, with reference to the dialog information 3D (see FIG. 15: to be described in detail later), the main dialog location for the currently displayed dialog box is compared with the main dialog location for the dialog box as the jump destination (S51).

FIG. 15 shows an example of the dialog information 3D. The dialog information 3D is configured with information on dialog name, information on dialog location, and condition information. The dialog location is expressed as a hexadecimal number with three digits that represent the main dialog location, sub dialog location, sub-sub dialog location in sequence from the largest digit, respectively.

For example, the location of the dialog box "Basic" is represented as a main dialog location 1 (0x100). In addition, the location of the dialog box "Color Enhancement" is expressed by "0x111", as it is in a sub-sub dialog location 1 (0x001) that is located at a further lower level than a sub dialog location 1 (0x000: the dialog box "Quality") that is located at a lower level than the main dialog location 1 (0x100: the dialog box "Basic"). Further, the dialog location of the dialog box "User Defined Size" is expressed by "0x120", as it is in a sub dialog location 2 (0x020) that is located at a lower level than the main dialog location 1 (0x100).

In addition, the condition information represents a condition required for opening a corresponding sub dialog box or sub-sub dialog box. Condition information "0" means no condition. In addition, condition information "1" for the dialog box "Color Enhancement" means that it is required for opening the dialog box "Color Enhancement" to configure a setting for "Color Enhancement" ON (valid). Further, condition information "2" for the dialog box "User Defined Size" means that it is required for opening the dialog box "User Defined Size" to set a paper size to a user defined size.

FIG. 16 shows an example of the jump destination information 3J. The jump destination information 3J represents a location of a setting item to be configured as the jump destination, and includes location information A that represents a location of a dialog box containing the setting item as the jump destination and location information B that represents a location of the setting item as the jump destination in the dialog box containing it. The location information A is expressed as a hexadecimal number with three digits that represent the main dialog location, sub dialog location, sub-sub dialog location in sequence from the largest digit, respectively.

For example, the location information A of the setting item "Color Density" is expressed by "0x111", as the setting item "Color Density" is included in the sub-sub dialog location 1 (0x001: the dialog box "Color Enhancement") that is located at a further lower level than the sub dialog location 1 (0x010: the dialog box "Quality") that is located at a lower level than the main dialog location 1 (0x100: the dialog box "Basic"). Further, the location information B of the setting item "Color Density" is expressed by "1", as the setting item "Color Density" is located at the head of the dialog box "Color Enhancement" as shown in FIG. 10. In addition, the location information A of the setting item "User Defined Size" is expressed by "0x120", as the setting item "User Defined Size" is included in the sub dialog location 2 (0x020: the dialog box "User Defined Size") that is located at a lower level than the main dialog location 1 (0x100: the dialog box "Basic"). Further, since the setting item "User Defined Size" is set on the dialog box "User Defined Size", the location information B thereof is expressed by "1".

It is noted that the dialog location (0x111) of the dialog box "Color Enhancement" shown in FIG. 15 represents the location of the dialog box for actually configuring settings for "Color Enhancement", while the location information A (0x110) of the jump destination for "Color Enhancement" represents the location of the dialog box for performing an operation for opening the dialog box "Color Enhancement".

Referring to FIG. 12 again, when the main dialog location of the currently displayed dialog box is the same as that of the dialog box as the jump destination (S51: Yes), the process is terminated, and the next process of comparing sub dialog locations is started (S44).

Meanwhile, when the main dialog location of the currently displayed dialog box is different from that of the dialog box as the jump destination (S51: No), the dialog location of the currently displayed dialog box is read into the dialog location information buffer. Then, it is checked whether a numerical value of the digit for the sub-sub dialog location of the dialog location stored in the dialog location information buffer is a numerical value other than "0" (S52). When it is judged that the numerical value of the digit for the sub-sub dialog location of the dialog location stored in the dialog location information buffer is a numerical value other than "0" (S52: Yes), information "The sub-sub dialog box is closed" is added to the dialog change information (see FIG. 17: to be described in detail later) (S56). Then, the information on the sub-sub dialog location of the dialog location stored in the dialog location information buffer is cleared (S57).

Next, it is checked whether a numerical value of the digit for the sub dialog location of the dialog location stored in the dialog location information buffer is a numerical value other than "0" (S53). When it is judged that the numerical value of the digit for the sub dialog location of the dialog location stored in the dialog location information buffer is a numerical value other than "0" (S53: Yes), information "The sub dialog box is closed" is added to the dialog change information (S58). Then, the information on the sub dialog location of the dialog location stored in the dialog location information buffer is cleared (S59).

Subsequently, with reference to the dialog location information as shown in FIG. 15, it is checked whether a condition for the condition information exists on a process until the main dialog box for the jump destination is opened (namely, whether a value other than "0" for the condition information exists on the process until the main dialog box for the jump destination is opened) (S54). When a value of the condition information is different from that in the printer driver setting information 3K as the current settings, or when a condition for the condition information exists on the process until the main dialog box for the jump destination is opened (S54: Yes), the condition information is added to the dialog change information (S60). Finally, information "The main dialog box is changed" is added to the dialog change information. Then, the current dialog location is replaced with the main dialog location included in the location information A, obtained from the jump destination information 3J, of the dialog box as the jump destination (S55).

When the currently displayed dialog box is changed from "Color Enhancement" shown in FIG. 10 to "Basic" shown in FIG. 4, since the main dialog location (I) for "Basic" (0x100) is the same as the main dialog location (1) for "Color Enhancement" (0x111), no step of S52 to S60 is executed in the aforementioned process. Therefore, no information is added to the dialog change information, and no location information is cleared in the dialog change information.

In addition, when the currently displayed dialog box is changed from "Custom Image Type" (0x210) to "Color Enhancement" (0x111) shown in FIG. 10, the main dialog locations for the both dialog boxes are different (the main dialog location for "Custom Image Type" is "2", while that for "Color Enhancement" is "1"), and the dialog location of the dialog box "Color Enhancement" stored in the dialog location information buffer corresponds to a location of a sub-sub dialog box. Therefore, information of "The sub-sub dialog box is closed", "The sub dialog box is closed", and "The main dialog box is changed to "Advanced (Color)"" is added to the dialog change information. Then, the location information A (0x200) for the dialog box "Advanced (Color)" as the jump destination is obtained and defined as a current dialog location. It is noted that since the value of the condition information for "Advanced (Color)" is "0", no condition information is added to the dialog change information.

Figure 13:
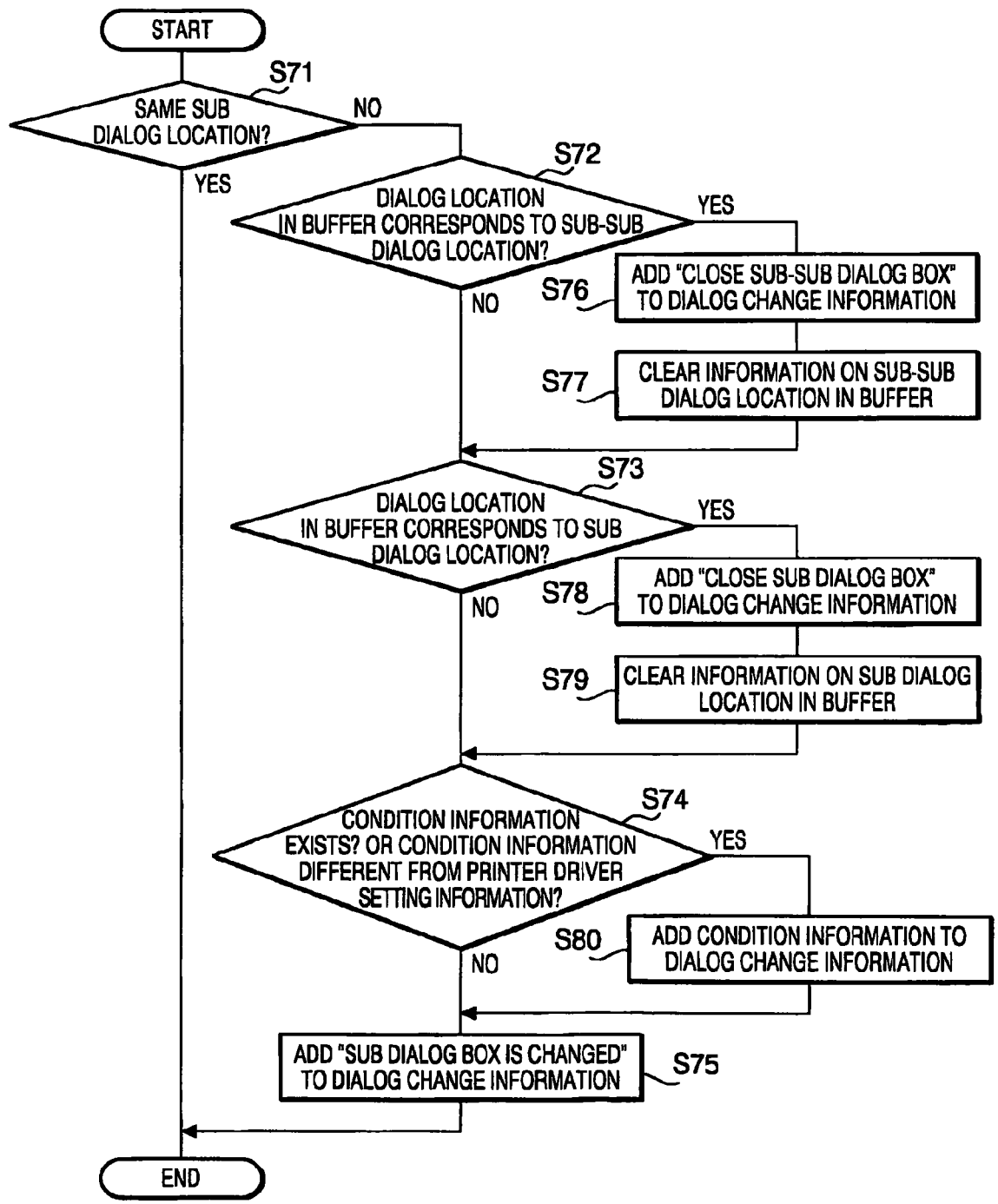
FIG. 13 is a flowchart showing a procedure of a sub dialog location comparing process in accordance with one or more aspects of the present invention.

Referring to FIG. 13, the sub dialog location comparing process corresponding to the step of S44 in FIG. 11 will be described. Firstly, with reference to the dialog information 3D (see FIG. 15: to be described in detail later) and the jump destination information 3J (see FIG. 16: to be described in detail later), the sub dialog location of the currently displayed dialog box is compared with the sub dialog location of the dialog box as the jump destination (S71).

When the sub dialog location of the currently displayed dialog box is the same as that of the dialog box as the jump destination (S71: Yes), the process is terminated, and the next process of comparing the sub-sub dialog locations (S45) is executed.

In the meantime, when the sub dialog location of the currently displayed dialog box is different from that of the dialog box as the jump destination (S71: No), the current dialog location is read into the dialog location information buffer.

Then, necessary information is added to the dialog change information based on the dialog location stored in the dialog location information buffer (S72, S73, and S76 to S79). Since the steps of S72, S73, and S76 to S79 are similar to S52, S53, and S56 to S59, respectively, detailed explanations regarding them will be omitted.

Next, with reference to the dialog location information as shown in FIG. 15, it is checked whether a condition for the condition information exists on a process until the sub dialog box for the jump destination is opened (namely, whether a value other than "0" for the condition information exists on the process until the sub dialog box for the jump destination is opened) (S74). When a value of the condition information is different from that in the printer driver setting information 3K as the current settings, or when a condition for the condition information exists on the process until the sub dialog box for the jump destination is opened (S74: Yes), the condition information is added to the dialog change information (S80). Finally, information "The sub dialog box is changed" and the location information A and B, obtained from the jump destination information 3J, for reaching the sub dialog box for the jump destination are added to the dialog change information (S75).

When the currently displayed dialog box is changed from "Basic" shown in FIG. 4 to "Color Enhancement" shown in FIG. 10, the sub dialog location (0) for the dialog box "Basic" (0x100) is different from the sub dialog location (1) for the dialog box "Color Enhancement" (0x111), and the current dialog location (0x100) corresponds to a location of a main dialog box, and further the value of the condition information for "Advanced (Color)" is "0". Accordingly, information "The sub dialog box is changed" is added to the dialog change information. In addition, with reference to the jump destination information 3J, the location information A (0x100) and location information B (2) for the dialog box "Quality" as the jump destination are obtained. Further, information "the second parameter in the dialog box "Basic" ("Setting" for "Quality") is operated" is added to the dialog change information.

In addition, for example, when the currently displayed dialog box is changed from "Color Enhancement" (0x111) shown in FIG. 10 to "Custom Image Type" (0x210), since the current dialog location stored in the dialog location information buffer after the main dialog location comparing process is "0x200", the sub dialog location thereof (0) is different from that of "Custom Image Type" (1). Further, the current dialog location (0x200) stored in the dialog location information buffer corresponds to a location of a main dialog box. Therefore, information "The sub dialog box is changed" is added to the dialog change information. It is noted that since the value of the condition information for "Custom Image Type" is "0", no condition information is added to the dialog change information.

Figure 14:
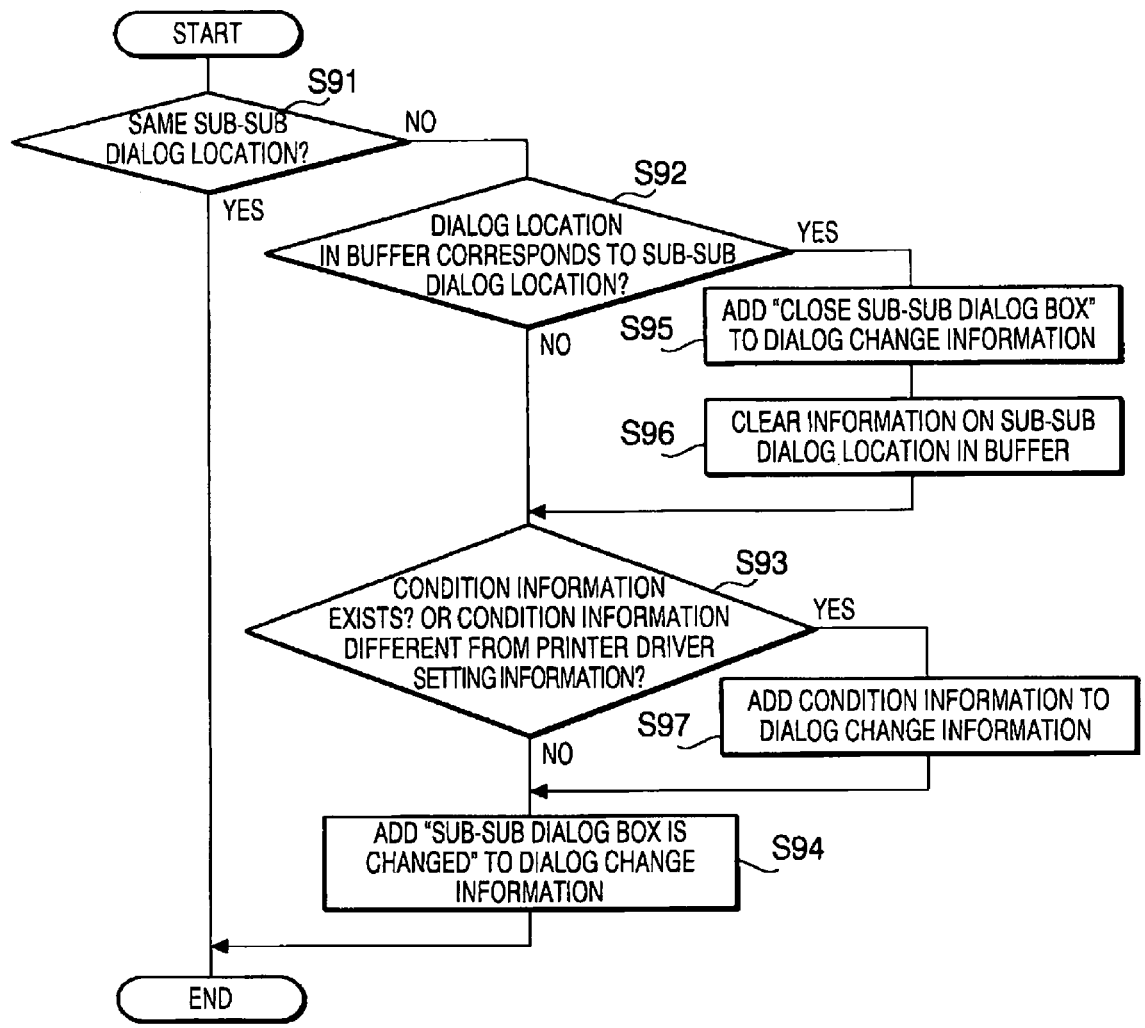
FIG. 14 is a flowchart showing a procedure of a sub-sub dialog location comparing process in accordance with one or more aspects of the present invention.

Referring to FIG. 14, the sub-sub dialog location comparing process corresponding to the step of S45 in FIG. 11 will be explained. Firstly, with reference to the dialog information 3D (see FIG. 15: to be described in detail later) and the jump destination information 3J (see FIG. 16: to be described in detail later), the sub-sub dialog location of the currently displayed dialog box is compared with the sub-sub dialog location of the dialog box as the jump destination (S91).

When the sub-sub dialog location of the currently displayed dialog box is the same as the sub-sub dialog location of the dialog box as the jump destination (S91: Yes), the process is terminated, and then the next dialog change information list generating process (S46) is executed.

In the meantime, when the sub-sub dialog location of the currently displayed dialog box is different from the sub-sub dialog location of the dialog box as the jump destination (S91: No), the current dialog location is read into the dialog location information buffer. Then, necessary information is added to the dialog change information based on the dialog location stored in the dialog location information buffer (S92, S95, and S96). Since the steps of S92, S95, and S96 are similar to S52, S56, and S57 in FIG. 12, respectively, detailed explanations regarding them will be omitted.

Next, with reference to the dialog location information as shown in FIG. 15, it is checked whether a condition for the condition information exists on a process until the sub-sub dialog box as the jump destination is opened (namely, whether a value other than "0" for the condition information exists on the process until the sub-sub dialog box as the jump destination is opened) (S93). When a value of the condition information is different from that in the printer driver setting information 3K as the current settings, or when a condition for the condition information exists on the process until the sub-sub dialog box as the jump destination is opened (S93: Yes), the condition information is added to the dialog change information (S97). Finally, information "The sub-sub dialog box is changed" and the location information A and B, obtained from the jump destination information 3J, for reaching the sub-sub dialog box as the jump destination are added to the dialog change information (S94).

When the currently displayed dialog box is changed from "Basic" shown in FIG. 4 to "Color Enhancement" shown in FIG. 10, the sub-sub dialog location (0) for the dialog box "Basic" (0x100) is different from the sub-sub dialog location (1) for the dialog box "Color Enhancement" (0x111), and further the current dialog location (0x110) stored in the dialog location information buffer after the sub dialog location comparing process corresponds to a location of a sub dialog box. Therefore, information "The sub-sub dialog box is changed" is added to the dialog change information. In addition, with reference to the jump destination information 3J, the location information A (0x110) and location information B (2) for the dialog box "Color Enhancement" as the jump destination are obtained. Further, information "the second parameter in the dialog box "Quality" is operated (the check box "Color Enhancement" is checked to set the settings for "Color Enhancement" in the valid state)" is added before the information "The sub-sub dialog box is changed" in the dialog change information.

FIG. 17 shows an example of the dialog change information list 3L to be generated based on the dialog change information to which the necessary information is added in the steps of S43 to S45 in the case where the currently displayed dialog box is changed from "Basic" shown in FIG. 4 to "Color Enhancement" shown in FIG. 10. The dialog change information list 3L includes information regarding dialog box names and operations provided on the respective dialog boxes in the order of the dialog boxes displayed. Namely, the information included in the dialog change information list 3L is as follows:

(1) The "Setting" button for "Quality" is clicked in the dialog box "Basic";
(2) The dialog box "Quality" is opened;
(3) The check box "Color Enhancement" is checked on the dialog box "Quality" to set the settings for "Color Enhancement" in the ON (valid) state;
(4) The "Detailed Settings" button is clicked on the dialog box "Quality";
(5) The dialog box "Color Enhancement" is opened.
Thereafter, it is possible to adjust a level of "Color Density".

When the currently displayed dialog box is changed from "Color Enhancement" shown in FIG. 10 to "Custom Image Type", the information included in the dialog change information list 3L is as follows:
(1) The dialog box "Color Enhancement" is closed;
(2) The currently displayed dialog box gets back to "Quality";
(3) The dialog box "Quality" is closed;
(4) The currently displayed dialog box gets back to "Basic";
(5) The dialog box "Color (Advanced)" is opened;
(6) The dialog box "Custom Image Type" is opened.

Hereinabove, the embodiments of the present invention have been described. However, these are only exemplary embodiments of the present invention. However, the present invention is not limited to the aforementioned embodiments, and various sorts of modifications based on knowledge of a person with an ordinary skill in the art may be possible as far as they are within a technical scope which does not extend beyond a subject matter of the present invention.

For example, the present invention can be applied to a Multi Function Peripheral (MFP) provided with a display portion and an operating portion such as a touch panel, as well as to the printing system 100 as the printer connected with the personal computer as shown in FIG. 1. The MFP includes a copy function, printing function, scanner function, and FAX function. For each of the functions, various settings are configured on a corresponding dialog box displayed on the display portion, and the user configures the settings by operating the operating portion to allow the MFP to provide a desired output. It is noted that the printing function of the MFP is actualized by a configuration similar to the printing system 100 shown in FIG. 1.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An electronic device provided with a plurality of functions, comprising:
    a display system configured to display a setting window for configuring setting items for each of the plurality of functions of the electronic device;
    an input system through which information for configuring the setting items for each of the plurality of functions is inputted on the setting window displayed on the display system;
    a setting item information storing system configured to store setting item information that includes location information associated with each of the setting items;
    a searching system configured to search and retrieve an intended setting item based on a keyword inputted through the input system and the setting item information stored in the setting item information storing system;

a setting information generating system configured to generate setting information that includes information on the intended setting item retrieved by the searching system and information on other setting items to be configured prior to configuring of the intended setting item in association with each other, based on the setting item information stored in the setting item information storing system wherein the setting information generated by said setting information generating system contains names of setting windows for configuring the intended setting item and said other setting items and operations provided on the setting windows, in a transition order in which the setting windows are to be sequentially displayed on said display system until the setting window for configuring the intended setting item is displayed; and a display control system configured to control the display system to display the setting information generated by the setting information generating system and the setting windows for configuring the intended setting item and said other setting items to be configured prior to configuring of the intended setting item, based on the setting item information and the setting information.

2. The electronic device according to claim 1, wherein the setting items for the plurality of functions of the electronic device are categorized based on a hierarchy structure, said hierarchy structure corresponding to the transition order of the setting windows for an intended setting item, and wherein the setting item information storing system is configured to store the setting item information that includes hierarchy structural location information based on the hierarchy structure of the setting items associated with each of the setting items.

3. The electronic device according to claim 2, wherein the setting information, generated by the setting information generating system is stored in a setting information storing system.

4. The electronic device according to claim 2, wherein the display control system is configured to control the display system to sequentially display the setting windows in the transition order, where the intended setting item is the last setting window sequentially displayed.

5. The electronic device according to claim 4, wherein the display control system is configured to control the display system to generate a notification that the setting window for the intended setting item has been displayed.

6. The electronic device according to claim 2, wherein the setting item information storing system is configured to store the setting item information that includes condition information, which represents a setting condition for a setting item one hierarchy level higher than each of the setting items, the setting condition being necessary for configuring each of the setting items after configuring the setting item one hierarchy level higher than each of the setting items.

7. The electronic device according to claim 1, wherein, when the searching system has searched a plurality of setting items as the intended setting item, the searching system is configured to retrieve the intended setting item in accordance with input information inputted through the input system from the plurality of setting items searched by the searching system.

8. The electronic device according to claim 5, where said notification is a display of said setting window for the intended setting item in a default color for a preset period of time.

9. The electronic device according to claim 5, where said notification is a blinking of said setting window for the intended setting item for a preset number of times.

10. A computer readable storage device having computer readable instructions that cause a computer to serve as:
a display system configured to display a setting window for configuring setting items for each of the plurality of functions of the electronic device;
an input system through which information for configuring the setting items for each of the plurality of functions is inputted on the setting window displayed on the display system;
a setting item information storing system configured to store setting item information that includes location information associated with each of the setting items;
a searching system configured to search and retrieve an intended setting item based on a keyword inputted through the input system and the setting item information stored in the setting item information storing system;
a setting information generating system configured to generate setting information that includes information on the intended setting item retrieved by the searching system and information on other setting items to be configured prior to configuring of the intended setting item in association with each other based on the setting item information stored in the setting item information storing system, wherein the setting information generated by said setting information generating system contains names of setting windows for configuring the intended setting item and said other setting items and operations provided on the setting windows, in a transition order in which the setting windows are to be sequentially displayed on said display system until the setting window for configuring the intended setting item is displayed; and
a display control system configured to control the display system to display the setting information generated by the setting information generating system and the setting windows for configuring the intended setting item and said other setting items to be configured prior to configuring of the intended setting item, based on the setting item information and the setting information.

11. The computer readable storage device according to claim 10,
wherein the setting items for the plurality of functions of the electronic device are categorized based on a hierarchy structure, said hierarchy structure corresponding to the transition order of the setting windows for an intended setting item, and
wherein the setting item information storing system is configured to store the setting item information that includes hierarchy structural location information based on the hierarchy structure of the setting items associated with each of the setting items.

12. The computer readable storage device according to claim 11,
wherein the setting information, generated by the setting information generating system is stored in a setting information storing system.

13. The computer readable storage device according to claim 11, wherein the display control system is configured to control the display system to sequentially display the setting windows in the transition order, where the intended setting item is the last setting window sequentially displayed.

14. The computer readable storage device according to claim 13,
wherein the display control system is configured to control the display system to generate a notification that the setting window for the intended setting item has been displayed.

15. The computer readable storage device according to claim 11,
wherein the setting item information storing system is configured to store the setting item information that includes condition information, which represents a setting condition for a setting item one hierarchy level higher than each of the setting items, the setting condition being necessary for configuring each of the setting items after configuring the setting item one hierarchy level higher than each of the setting items.

16. The computer readable storage device according to claim 10,
wherein, when the searching system has searched a plurality of setting items as the intended setting item, the searching system is configured to retrieve the intended setting item in accordance with input information inputted through the input system from the plurality of setting items searched by the searching system.

* * * * *